United States Patent
Iwashiro

(10) Patent No.: US 10,553,248 B1
(45) Date of Patent: Feb. 4, 2020

(54) MAGNETIC DISK DEVICE AND HEAD POSITION CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Masafumi Iwashiro, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/352,010

(22) Filed: Mar. 13, 2019

(30) Foreign Application Priority Data

Sep. 18, 2018 (JP) .................................. 2018-173878

(51) Int. Cl.
  *G11B 5/09* (2006.01)
  *G11B 21/08* (2006.01)
  *G11B 33/08* (2006.01)

(52) U.S. Cl.
  CPC .............. *G11B 21/08* (2013.01); *G11B 33/08* (2013.01)

(58) Field of Classification Search
  None
  See application file for complete search history.

(56) References Cited

U.S. PATENT DOCUMENTS

| 7,145,746 B1* | 12/2006 | Hirano | G11B 5/59627 360/77.04 |
| 8,503,124 B2 | 8/2013 | Uchida et al. | |
| 8,896,955 B1* | 11/2014 | Chen | G11B 5/59694 360/55 |
| 9,214,185 B1 | 12/2015 | Song et al. | |
| 2007/0064334 A1* | 3/2007 | Jia | G11B 5/5582 360/77.02 |
| 2007/0183076 A1* | 8/2007 | Baugh | G11B 5/5582 360/75 |
| 2008/0117540 A1* | 5/2008 | Kang | G11B 19/042 360/70 |
| 2009/0116136 A1* | 5/2009 | Zhang | G11B 5/5582 360/75 |
| 2009/0296265 A1 | 12/2009 | Kisaka et al. | |

(Continued)

FOREIGN PATENT DOCUMENTS

| JP | 2009-123259 A | 6/2009 |
| JP | 2009-289373 A | 12/2009 |
| JP | 2019-40657 A | 3/2019 |

*Primary Examiner* — Peter Vincent Agustin
(74) *Attorney, Agent, or Firm* — White & Case LLP

(57) ABSTRACT

According to one embodiment, a magnetic disk device reads servo information from a recording surface of a magnetic disk using a head, detects a position of the head based on the servo information, and estimates a vibration frequency of a disturbance applied to the head and filtering the estimated vibration frequency from a drive signal of the head. In the filtering, a position error is calculated using a target position of the head given when driving the head and the detected position of the head, a plurality of the vibration frequencies is estimated by executing the vibration frequency estimation based on the position error in a plurality of stages in series, and estimation results of the vibration frequencies are filtered in parallel from the drive signal of the head.

8 Claims, 11 Drawing Sheets

(56) References Cited

U.S. PATENT DOCUMENTS

| | | | |
|---|---|---|---|
| 2013/0335857 A1* | 12/2013 | Bui | G11B 5/584 |
| | | | 360/77.12 |
| 2016/0343393 A1 | 11/2016 | Iwashiro | |
| 2018/0336923 A1* | 11/2018 | Hironaka | G11B 5/59627 |
| 2019/0066727 A1 | 2/2019 | Iwashiro | |

* cited by examiner

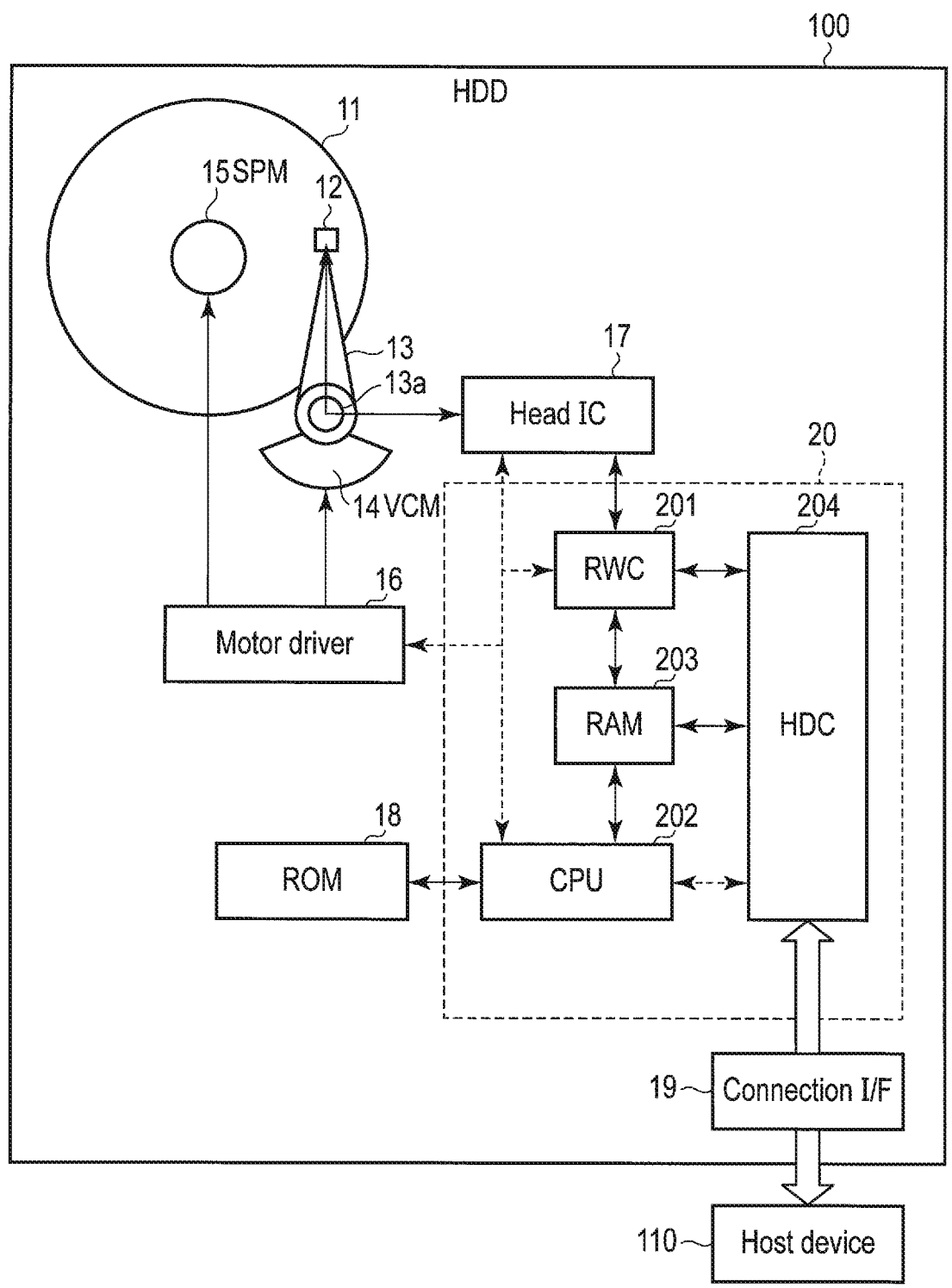
F I G. 1

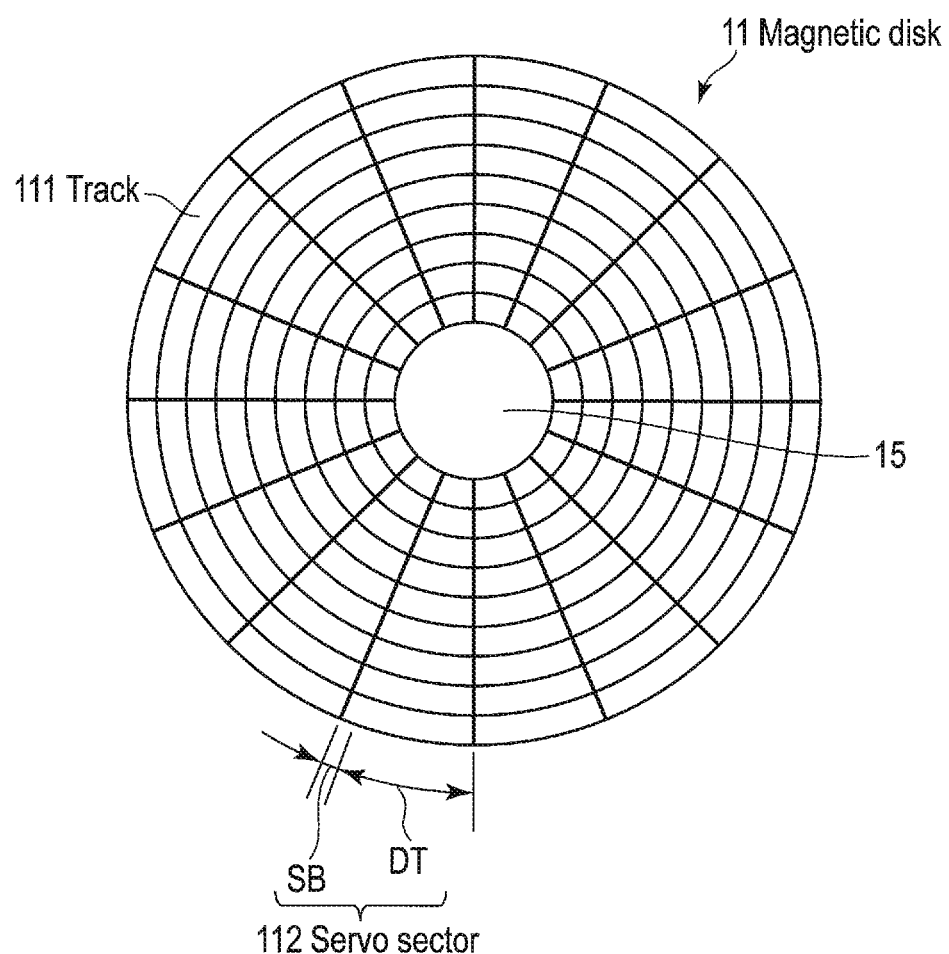
F I G. 2

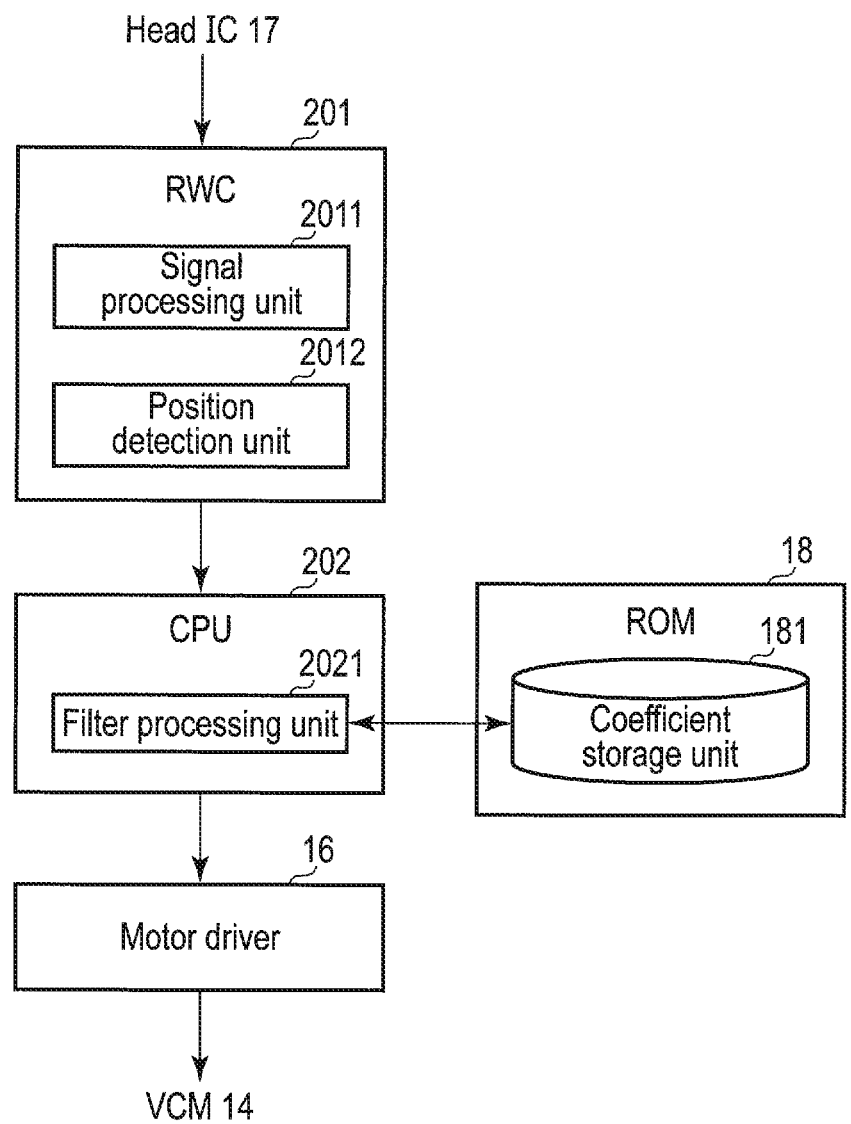
F I G. 3

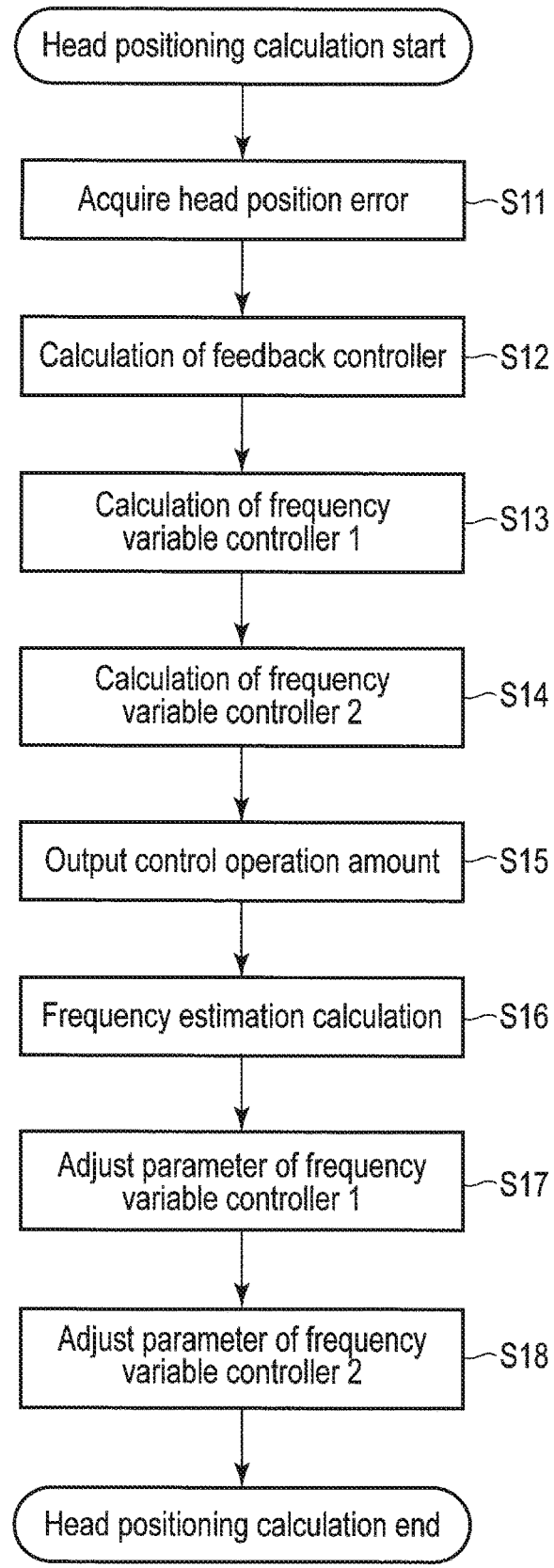
F I G. 6

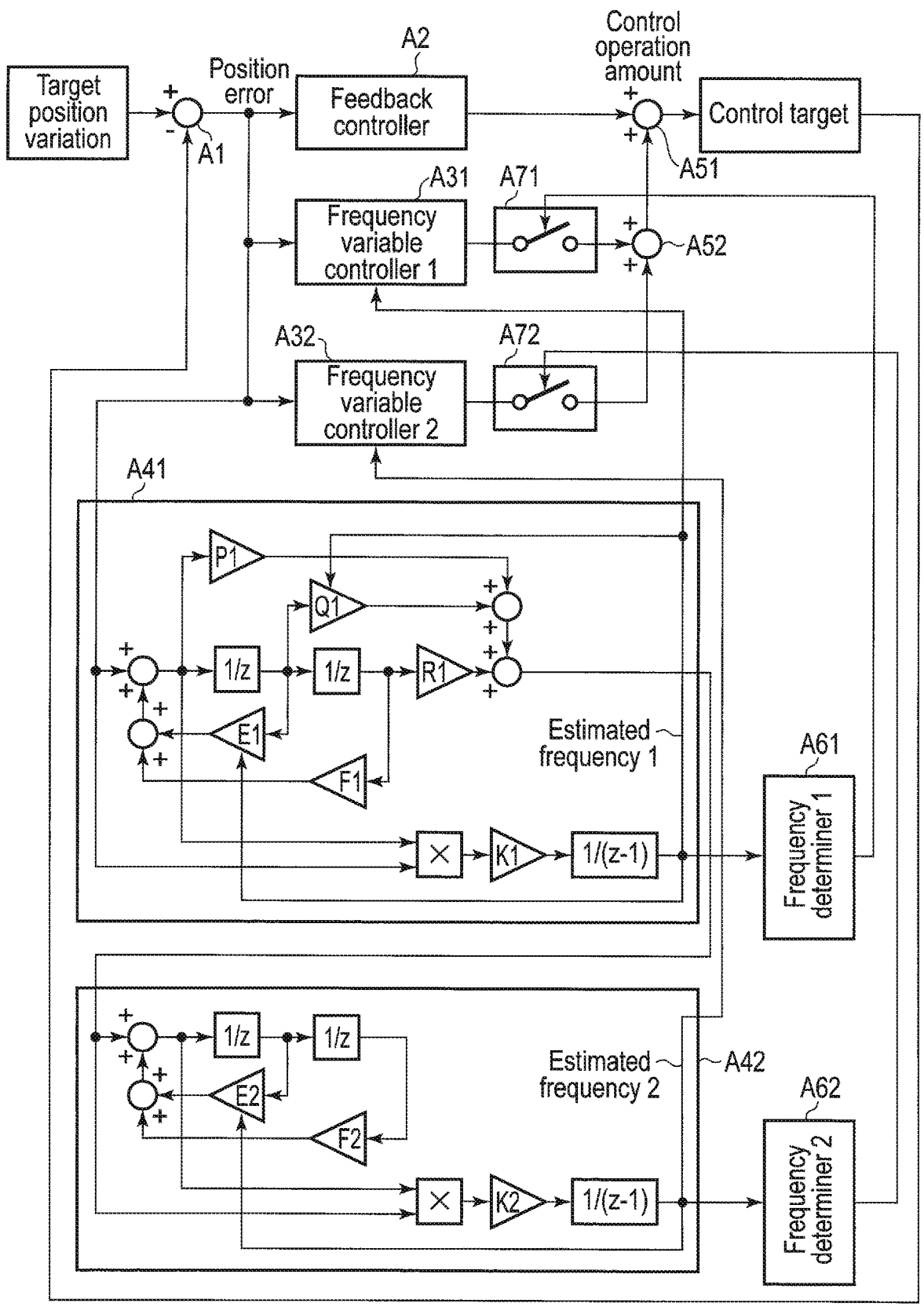
F I G. 13

MAGNETIC DISK DEVICE AND HEAD POSITION CONTROL METHOD

CROSS-REFERENCE TO RELATED APPLICATIONS

This application is based upon and claims the benefit of priority from Japanese Patent Application No. 2018-173878, filed Sep. 18, 2018, the entire contents of which are incorporated herein by reference.

FIELD

Embodiments described herein relate generally to a magnetic disk device and a head position control method therefor.

BACKGROUND

Recently, in magnetic disk devices, a technique of estimating a vibration frequency of a disturbance component applied to a head using an adaptive filter in a servo system that performs head positioning control and filtering the estimated frequency from a head drive signal has been proposed. In the conventional filter processing, however, only one vibration frequency can be handled by a transfer function of the adaptive filter, and there is a possibility that the operation becomes unstable when vibration of a plurality of frequencies is applied.

An object of an embodiment of the present invention is to provide a magnetic disk device capable of eliminating an unstable operation due to vibration frequencies of a plurality of disturbance components in head positioning control, and a head position control method therefor.

BRIEF DESCRIPTION OF THE DRAWINGS

FIG. 1 is a block diagram illustrating a configuration of a magnetic disk device according to a first embodiment;

FIG. 2 is a diagram illustrating a configuration of a magnetic disk in the first embodiment;

FIG. 3 is a block diagram illustrating a configuration of a servo system that performs head position control in the first embodiment;

FIG. 6 is a flowchart illustrating a procedure of head positioning calculation processing of the filter processing unit in the first embodiment;

FIG. 13 is a block diagram illustrating a configuration of a filter processing unit of a magnetic disk device according to a third embodiment.

DETAILED DESCRIPTION

Figure 4:
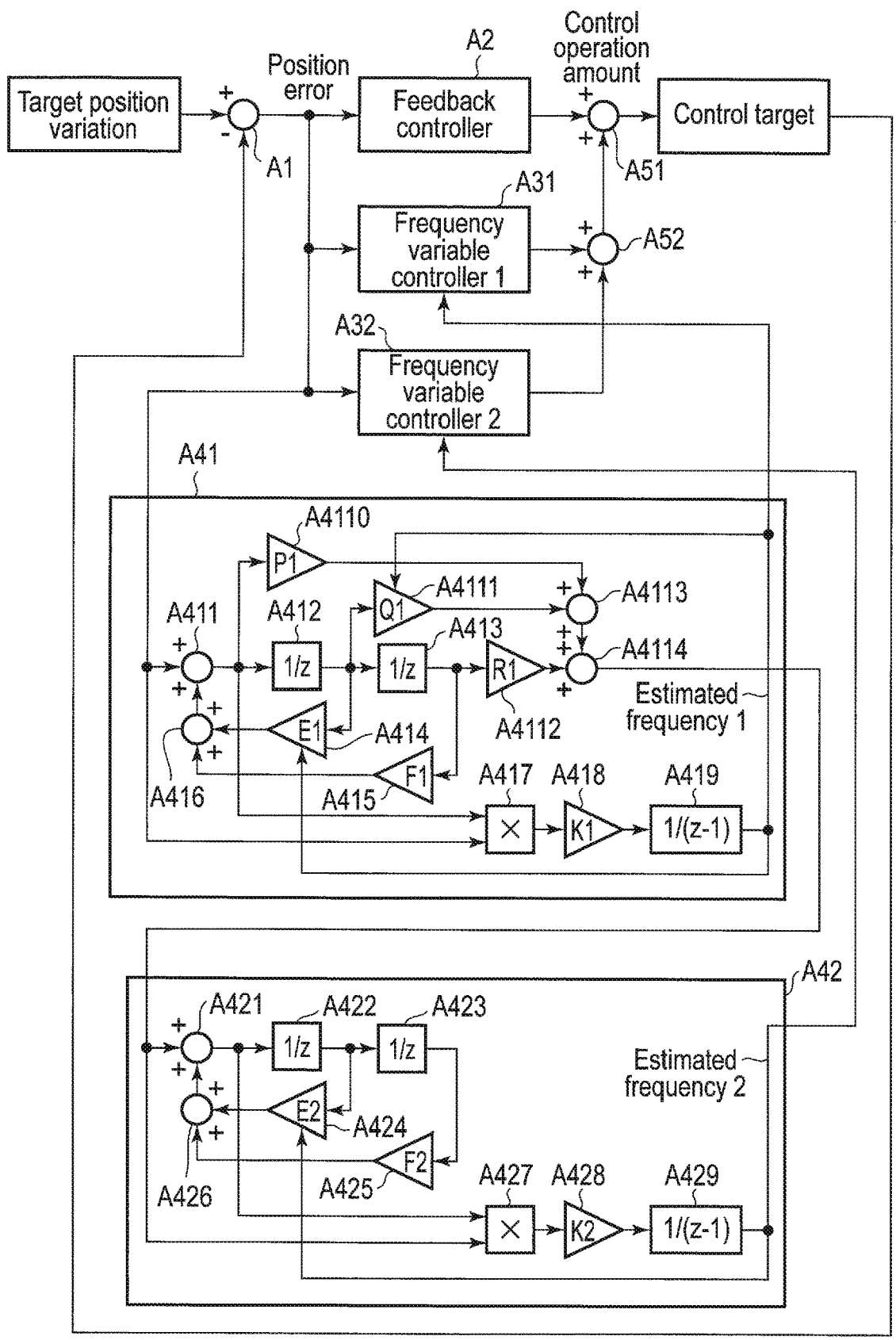
FIG. 4 is a block diagram illustrating a configuration of a filter processing unit in the first embodiment.

Embodiments will be described hereinafter with reference to the accompanying drawings.

In general, according to one embodiment, a magnetic disk device includes a magnetic recording medium, a head, a detector, and a filter. The magnetic recording medium is a disk-shaped medium in which servo information including position information has been recorded on a recording surface. The head reads the servo information from the magnetic recording medium. The detector detects a position of the head based on the servo information read by the head. The filter estimates a vibration frequency of a disturbance applied to the head and filters the estimated vibration frequency from a drive signal of the head. Wherein the filter calculates a position error using a target position of the head given at the time of driving the head and the position detected by the detector, estimates a plurality of vibration frequencies by executing the vibration frequency estimation processing based on the position error in a plurality of stages in series, and filters estimation results of the plurality of vibration frequencies in parallel from the drive signal of the magnetic head.

It should be noted that the disclosure is merely an example, and appropriate modifications that can be easily conceived in keeping a gist of the invention by those skilled in the art are, of course, included in the scope of the present invention in the following description. In addition, the drawings are merely examples although schematically representing a width, a thickness, a shape, and the like of each part as compared to the actual forms in order to clarify the description, and do not limit interpretation of the present invention. In addition, the same reference signs will be given to the same constituent elements as those described above in regard to the preceding drawings, and redundant detailed descriptions will be omitted as appropriate in some cases in this specification and the respective drawings.

First Embodiment

A configuration of a hard disk drive (HDD) will be described as an example of a magnetic disk device to which a first embodiment is applied with reference to FIGS. 1 and 2. Although the HDD is used as an example of the magnetic disk device in the present embodiment, an optical disk drive, a magneto-optical (MO) drive, or the like may be used.

FIG. 1 is a block diagram illustrating a configuration of an HDD 100 according to the present embodiment, and FIG. 2 is a diagram illustrating a configuration of a magnetic disk 11 in FIG. 1.

As illustrated in FIG. 1, the HDD 100 includes the magnetic disk 11, a head 12, an arm 13, a voice coil motor (VCM) 14, and a spindle motor (SPM) 15. In addition, the HDD 100 includes a motor driver 16, a head IC 17, a read only memory (ROM) 18, a connection I/F 19, and a controller 20. The controller 20 is configured as a system on chip (SOC) including at least a read write channel (RWC) 201, a CPU 202, a RAM 203, and a hard disc controller (HDC) 204. Incidentally, the controller 20 does not necessarily include the RAM 203, and the RAM 203 may be connected to the outside of the controller 20.

In FIG. 1, the magnetic disk 11 is fixed to the SPM 15 and rotates as the SPM 15 is driven to rotate. As illustrated in FIG. 2, at least one surface of the magnetic disk 11 is a recording surface on which information is magnetically recorded.

A plurality of tracks 111 is defined on the recording surface. The track 111 is one of recording regions arranged concentrically about a disk rotation axis. Each of the tracks 111 includes a plurality of servo sectors 112 equally divided in the circumferential direction. Assuming that the number of the servo sectors is N in the magnetic disk 11, the servo sectors are numbered from zero to N−1 around the rotation direction with a reference sector on the circumference numbered zero.

The servo sector 112 has a servo region SB and a data region DT. Only one servo region SB is arranged at a head of each of the servo sectors 112, and position information thereof is recorded. Since the magnetic disk 1 rotates at a constant angular speed, the position information is read into the head 2 at a constant time interval. The position information is physical address information and servo information on the recording surface of the magnetic disk 11. The servo information includes information for calculation of radial deviation from a track. The data region DT is a region storing a certain amount of information in each of the servo sectors 112. Information to be recorded on the HDD 100 is recorded in this data region DT.

In FIG. 1, the arm 13 has the head 12 at one end and a bearing 13*a* at the other end. The arm 13 rotates about the bearing 13*a* as a drive current (or a drive voltage) is supplied to the VCM 14, and moves the head 12 in the radial direction on the recording surface of the magnetic disk 11.

The head 12 includes a read head and a write head (none of which are illustrated). The read head and the write head are arranged so as to be displaced in the radial direction of the magnetic disk 1. The read head reads information which has been magnetically recorded on the recording surface of the magnetic disk 1. A read signal is output to the head IC 17. The write head magnetically records information on the recording surface of the magnetic disk 11 in response to a write signal (write current) input via the head IC 17.

The VCM 14 is driven in response to a drive signal (current or voltage) supplied from the motor driver 16 to be described later, thereby rotating the arm 13.

The SPM 15 is driven in response to an SPM drive signal (current or voltage) supplied from the motor driver 16, thereby rotating the magnetic disk 11.

The motor driver 16 supplies the drive signal for driving the VCM 14 to the VCM 14 based on a control signal from the controller 20. In addition, the motor driver 16 supplies the drive signal (current) for driving the SPM 15 to the SPM 15 based on a control signal from the controller 20.

The head IC 17 amplifies a signal input via a conductor pattern line formed on an upper portion of the arm 13 from the read head provided in the head 12 and outputs the amplified signal as read information to the controller 20. In addition, the head IC 17 outputs a write signal corresponding to recording information input from the controller 20 to the write head provided in the head 12 via the conductor pattern line formed on the upper portion of the arm 13.

The read only memory (ROM) 18 stores programs to be executed by the central processing unit (CPU) 202 of the controller 20 and various parameters to be used in processing executed by the CPU 202.

The connection interface (I/F) 19 connects the HDD 100 and the host device 110 and is used for communication relating to transmission and reception of data and a command between the host device 110 and the HDD 100. In this manner, the HDD 100 is connected to the host device 110 via the connection I/F 19, and thus, functions as a storage module of the host device 110.

In the controller 20, the RAM 203 is a work memory (work area) of the RWC 201, the CPU 202, and the HDC 204. For example, a dynamic random access memory (DRAM) which is a volatile memory is applied to the RAM 203.

When the connection I/F 19 is an interface conforming to the serial advanced technology attachment (SATA) standard, the HDC 204 performs communication control conforming to the SATA standard with the host device 110. Although the example of using the SATA standard is described as the standard of the connection I/F in the present embodiment, it is also possible to use a connection I/F of another standard such as the serial attached SCSI (SAS) or the peripheral component interconnect express (PCIe).

The HDC 204 controls transmission and reception of information with respect to the host device 110. The HDC 204 performs a predetermined process on decoded information from the RWC 201 to encode the information, and transmits the encoded information to the host device 110. In addition, the HDC 204 performs a predetermined process on reception information received from the host device 110 to decode the information, and outputs the decoded information to the RWC 201 as information that needs to be recorded.

In addition, when receiving a write command including information on a logical address at which data recording starts and a recording data length from the host device 110, the HDC 204 extracts the information on the logical address and the recording data length from the received write command. The extracted information on the logical address and recording data length is output to the CPU 202.

The RWC (position detection unit) 201 detects servo information corresponding to the servo region SB based on read information input from the head IC 17, and extracts address information and position information from the detected servo information. The extracted address information and position information are output to the CPU 202.

In addition, the RWC 201 detects information corresponding to the data region DT from the read information, performs a predetermined process on the detected information, and decodes the detected information. The decoded information is output to the HDC 204.

Further, the RWC 201 performs a predetermined process on the information that needs to be recorded, which has been input from the HDC 204, to encode the information, and outputs the encoded information to the head IC 17 as the recording information. The RWC 201 uses the RAM 203 as a work memory for the plurality of processes described above.

The CPU 202 is a processor that controls the entire HDD 100. For example, the CPU 202 executes the programs stored in the ROM 18 and realizes various types of control by using the RAM 203 as the work area. For example, the CPU 202 performs rotation control of the VCM 14 and the SPM 15 and control of a process of reading information from the magnetic disk 11. As another example, the CPU 202 performs position control of the head 12 with respect to the radial direction of the recording surface of the magnetic disk 11 based on the position information extracted from the servo information recorded on the magnetic disk 11. Feedback control is used for the position control of the head 12 of the present embodiment.

In the feedback control, the CPU 202 calculates position error information based on the position information indicating an actual position where the head 12 exists based on the servo information read by the head 12 from the magnetic disk 11, and target position information indicating a target position of the head 12. Then, the CPU 202 causes a filter processing unit 2021 using the adaptive filter to perform a filtering process to suppress a vibration frequency of a disturbance component with respect to the calculated position error information.

The adaptive filter used for the filter processing unit 2021 of the present embodiment adaptively estimates an unspecified frequency component of the disturbance (hereinafter referred to as an estimated frequency) without using Fast Fourier Transform (FFT) with respect to the position error information. In the present embodiment, an infinite impulse response (IIR) type adaptive filter is used as the adaptive filter for positioning control of the head 12 of the HDD 100.

Next, a configuration to perform the position control of the head 12 in the present embodiment will be described. FIG. 3 is a block diagram illustrating a configuration of a servo system that performs the position control of the head 12 according to the present embodiment.

As illustrated in FIG. 3, the RWC 201 includes a signal processing unit 2011 and a position detection unit 2012. In addition, the CPU 202 executes the program stored in the ROM 18 to realize the filter processing unit 2021. In addition, the ROM 18 includes a coefficient storage unit 181 storing coefficients to be used in the adaptive filter of the filter processing unit 2021. In the present embodiment, the position control of the head 12 is performed by the signal processing unit 2011, the position detection unit 2012, the filter processing unit 2021, and the motor driver 16.

The coefficient storage unit 181 stores information on a filter coefficient that changes to correspond to the estimated frequency estimated by the adaptive filter.

The signal processing unit 2011 of the RWC 201 processes the read information input from the head IC 17. The signal processing unit 2011 performs processing such as demodulation and error correction on the input read information. The signal processing unit 2011 outputs the processed read information to the position detection unit 2012.

The position detection unit 2012 detects servo information from the read information input from the signal processing unit 2011. The position detection unit 2012 detects position information indicating a position at which the head 12 is reading from the detected servo information. The position detection unit 2012 outputs the detected position information to the CPU 202.

The position information is input to the CPU 202 from the position detection unit 2012 of the RWC 201. Then, the CPU 202 calculates position error information indicating a difference between an actual position indicated by the position information and a target position indicating a position as a target of the head 12.

The calculated position error information is input to the filter processing unit 2021 of the CPU 202. The filter processing unit 2021 adaptively estimates an unspecified frequency component of a disturbance with respect to the position control of the head 12 from the input position error information. Further, the filter processing unit 2021 performs filtering with a characteristic feature based on the estimated frequency. In the present embodiment, information on the filter coefficient stored in the coefficient storage unit 181 is referred to when deriving the characteristic feature based on the estimated frequency.

The filter processing unit 2021 will be described in detail. FIG. 4 is a block diagram illustrating a configuration of the filter processing unit 2021 according to the present embodiment. In FIG. 4, the position information indicating a target position variation, which has been obtained by the position detection unit 2012 of the RWC 201, is added with feedback information of a control object (VCM) by an adder A1 to be used as the position error information. This position error information is sent to a feedback controller A2, a first frequency variable controller A31, and a second frequency variable controller A32, and is sent to a first frequency estimator A41 and a second frequency estimator A42. That is, the magnetic disk 11 rotates at a constant angular velocity during the operation, and a head position is obtained from the servo region SB at the head of each of the servo sectors 112 in synchronism with a disk rotation angle. Therefore, the filter processing unit 2021 constitutes a sample value control system that determines an input to a control target at a constant time interval.

The frequency estimators A41 and A42 use a second-order IIR type adaptive digital filter (hereinafter referred to as an IIR filter) as an adaptive filter that self-adapts to a predetermined transfer function. Incidentally, the filter is not restricted to the second-order filter, and any filter may be used as long as the filter is a high-order filter.

In the present embodiment, the filter processing unit 2021 is constituted by the feedback controller A2, the first and second frequency estimators A41 and A42 using the second-order IIR filter, and the first and second frequency variable controllers A31 and A32 that correct the feedback controller A2 based on the estimation results. Since a plurality of sets of the frequency estimator and the frequency variable controller is provided in this manner, it is possible to cope with disturbance frequencies corresponding to the number of the sets.

Figure 5:
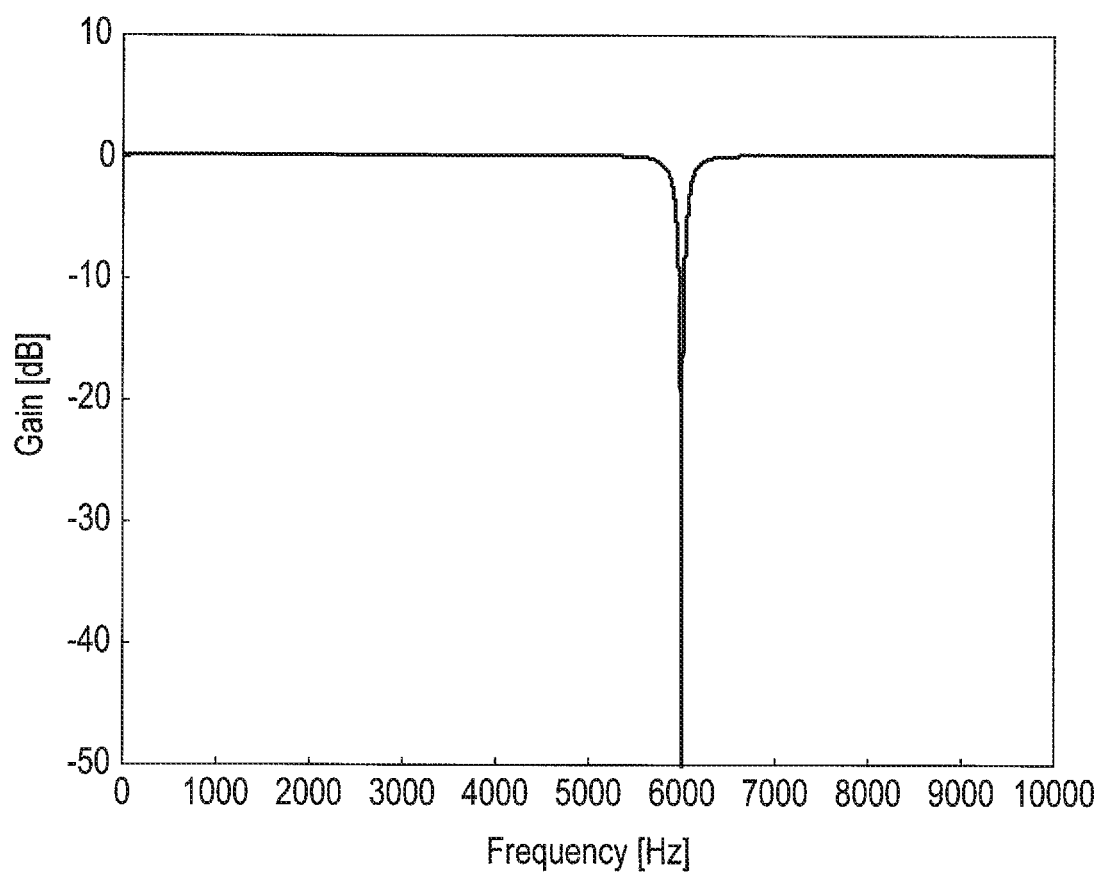
FIG. 5 is a characteristic diagram illustrating a frequency characteristic (in the case of an estimated frequency of 6000 Hz) in a single frequency estimator of the filter processing unit in the first embodiment.

The first and second frequency estimators A41 and A42 are second-order frequency removal filters, and the number of removal frequencies thereof varies in accordance with the input. FIG. 5 illustrates frequency characteristics of the frequency removal filter (=a single frequency estimator) when a removal frequency is 6000 Hz.

In the first frequency estimator A41 illustrated in FIG. 4, a position error (frequency) sent from the position detection unit 2012 becomes a denominator value after passing through a first adder A411. This denominator value becomes a primary delay value caused by first-order delay in a first delayer (1/z) A412 and further becomes a secondary delay value caused by second-order delay in a second delayer (1/z) A413. The denominator value of the first-order delay is multiplied by a gain coefficient E1 by an E1 calculator A414, and the denominator value of the second-order delay is multiplied by a gain coefficient F1 by an F1 calculator A415. Outputs of the E1 calculator A414 and the F1 calculator A415 are added by a second adder A416, and then, the added value is sent to the first adder A411 to be added with an input position error.

The denominator value output from the first adder A411 is sent to a multiplier A417 together with the input position error and then multiplied by a gain coefficient K1 by a K1 calculator A418, and is integrated by an integrator $(1/(z-1))$ A419. As a result, coefficients to be multiplied by inputs of one sample before the numerator and denominator are changed and sent to the first frequency variable controller A31 as a first estimated frequency.

In addition, an output of the first adder A411 is multiplied by a gain coefficient P1 by a P1 calculator A4110, an output of the first delayer (1/z) A412 is multiplied by a gain coefficient Q1 by a Q1 calculator A4111, and an output of the second delayer A413 is multiplied by a gain coefficient R1 by an R1 calculator A4112. An output of the P1 calculator A4110 and an output of the Q1 calculator A4111 are added by a third adder A4113 and further added with an output of the R1 calculator A4112 by a fourth adder A4114 to be a numerator value, and the numerator value is sent to the second frequency estimator A42.

The numerator value obtained by the first frequency estimator A41 is input to the second frequency estimator A42, this numerator value is used as a position error and becomes a denominator value after passing through a first adder A421. This denominator value becomes a primary delay value caused by first-order delay in a first delayer (1/z) A422 and further becomes a secondary delay value caused by second-order delay in a second delayer (1/z) A423. The denominator value of the first-order delay is multiplied by a gain coefficient E2 by an E2 calculator A424 and the denominator value of the second-order delay is multiplied by a gain coefficient F2 by an F2 calculator A425. Outputs of the E2 calculator A424 and the F2 calculator A425 are added by a second adder A426, and then, the added value is sent to a first adder A421 to be added with an input position error. The denominator value output from the first adder A421 is sent to a multiplier A427 together with the input position error and then multiplied by a gain coefficient K1 by a K1 calculator A428 and is integrated by an integrator (1/(z−1)) A429. As a result, coefficients to be multiplied by inputs of one sample before the numerator and denominator are changed and sent to the second frequency variable controller A32 as a second estimated frequency.

The first frequency variable controller A31 performs parameter adjustment in order to remove frequency components based on the first frequency estimated by the first frequency estimator A41. Similarly, the second frequency variable controller A32 performs parameter adjustment in order to remove the frequency components based on the second frequency estimated by the second frequency estimator A42. Results of the parameter adjustment obtained by the frequency variable controllers A31 and A32 are added by an adder A52, and further added with the output of the feedback controller A2 by an adder A53, and the added value is sent, as a control operation amount, to the VCM control system which is the control target.

Here, gain coefficients P(n), Q(n), R(n), E(n), and F(n) of the first and second frequency estimators A41 and A42 are expressed, using a filter number n (one or two), a coefficient r (for example, 0.99) to adjust the spread of a frequency removal filter, and an estimated frequency ω(n), as follows.

$P(n)=1;$ $Q(n)=w(n);$ $R(n)=1;$ $E(n)=-r*w(n);$ and $F(n)=-r^2$ (1)

The estimated frequency w(n) has the following relationship with an actual frequency fr(n) [Hz].

$w(n)=-2*\cos(2*p_i*f_r(n)*T)$ (2)

The frequency estimators A41 and A42 multiply an output of a denominator coefficient part by a current input, and then, perform integral by a gain K(n) to change coefficients to be multiplied by inputs one sample before the numerator and denominator. For example, the following values are used as adaptive coefficients.

$K(n)=-0.00001$ (3)

An initial value of an estimated frequency is set to zero.

Figure 7:
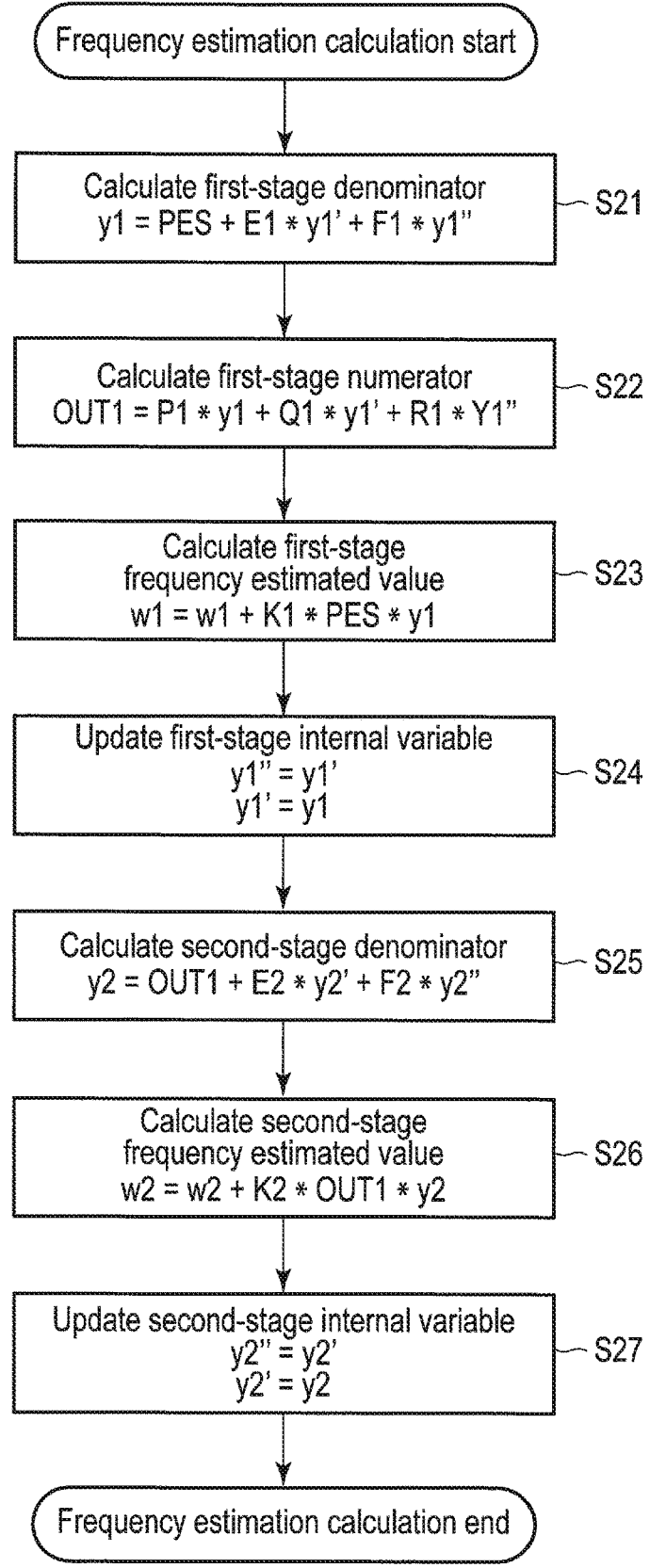
FIG. 7 is a flowchart illustrating a procedure of frequency estimation calculation processing of the filter processing unit in the first embodiment.

Processing procedures of the filter processing unit 2021 are illustrated in FIGS. 6 and 7. FIG. 6 is a flowchart illustrating a procedure of head positioning calculation processing of the filter processing unit according to the present embodiment, and FIG. 7 is a flowchart illustrating a procedure of frequency estimation calculation processing of the filter processing unit according to the present embodiment.

In FIG. 6, the position error information of the head 12 is obtained (Step S11), and then, the calculation of the feedback controller A2 (Step S12), the calculation of the first frequency variable controller A31 (Step S13), and the calculation of the second frequency variable controller A32 (Step S14) are performed, and each calculated control operation amount is output (Step S15). Next, the frequency estimation calculation illustrated in FIG. 7 is performed (Step S16), and the parameters of the first frequency variable controller A31 and the frequency variable controller A32 are adjusted based on the result (Steps S17 and S18). The parameters of the frequency variable controllers A31 and A32 may be set as an N-th order function of an estimated frequency or a plurality of fixed parameters may be switched.

In the frequency estimation calculation illustrated in FIG. 7, first, the first-stage frequency estimator A41 performs denominator calculation ($y_1=PES+E_1*y_1'+F_1*y_1''$) and numerator calculation ($OUT_1=P_1*y_1+Q_1*y_1'+R_1*y_1''$) (Steps S21 and S22), and then, performs frequency estimation calculation ($w_1=w_1+K_1*PES*y_1$) and internal variable update ($y_1''=y_1'$, $y_1'=y_1$) (Steps S23 and S24). Next, the second-stage frequency estimator A42 performs only the denominator calculation ($y_2=OUT_1+E_2*y_2'+F_2*y_2''$) (Step S25), and performs frequency estimator operation ($w_2=w_2+K_2*OUT_1*y_2$) and internal variable update ($y_2''=y_2'$, $y_2'=y_2$) (Steps S26 and S27). The numerator calculation of the second-stage frequency estimator A42 is used only for calculation of an input value when there is the next third stage, and is unnecessary in the present embodiment since there is no third stage.

Figure 8:
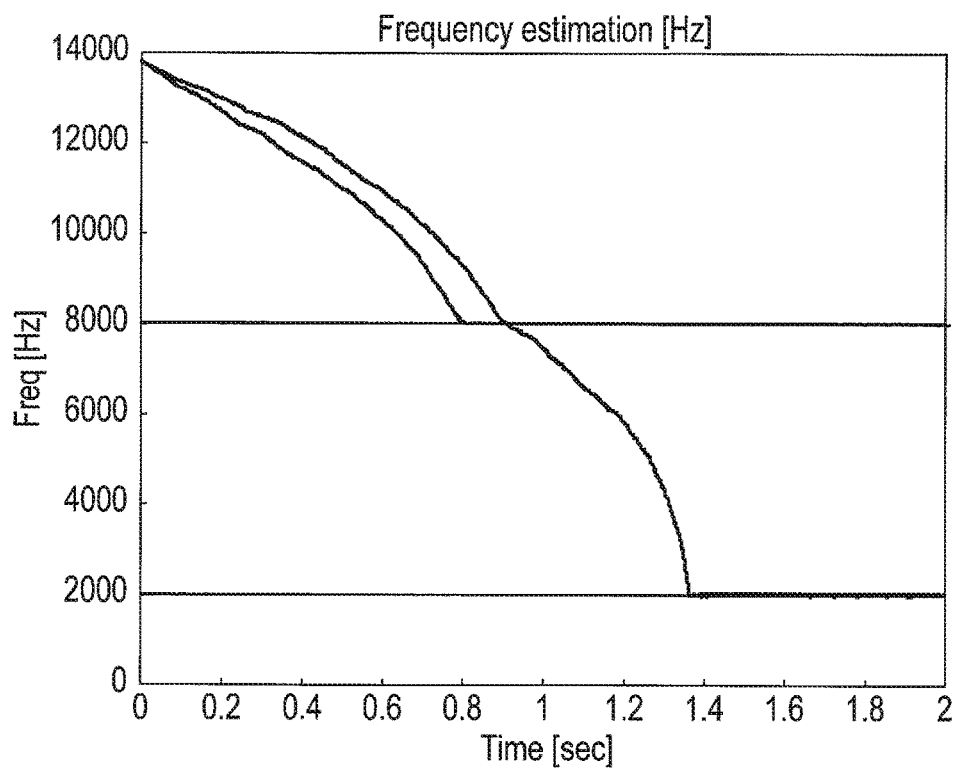
FIG. 8 is a waveform diagram illustrating a frequency estimation error when a disturbance component is present at 2000 Hz and 8000 Hz in the first embodiment.
Figure 9:
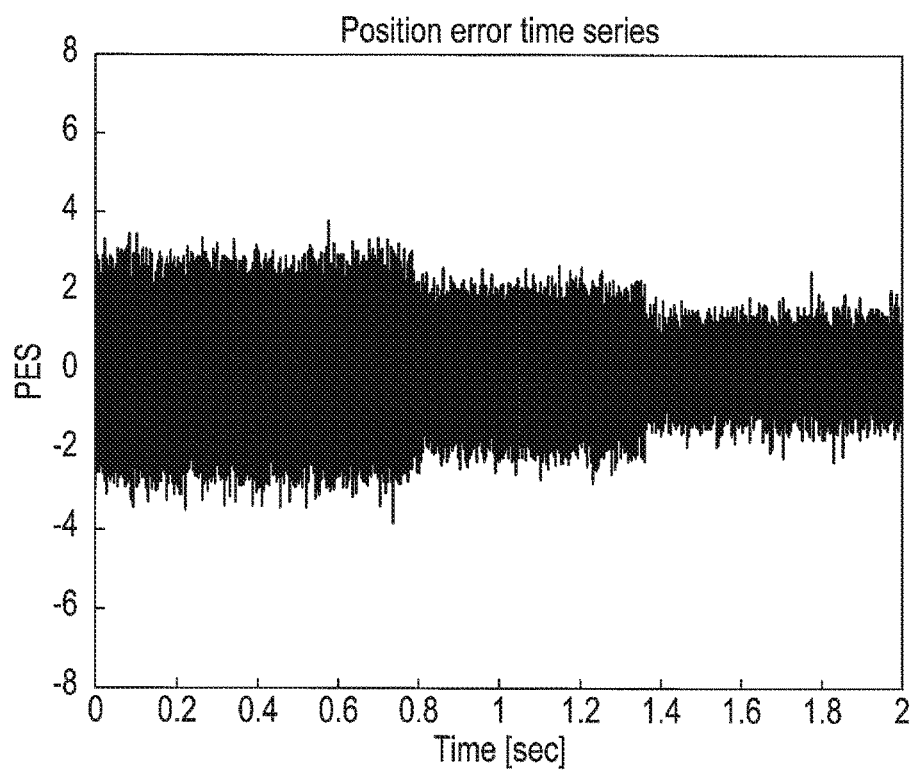
FIG. 9 is a waveform diagram illustrating a head position error when the disturbance component is present at 2000 Hz and 8000 Hz in the first embodiment.

FIGS. 8 and 9 illustrate a frequency estimation operation and a head position error in the case of having disturbance components at 2000 Hz and 8000 Hz, respectively. All the initial frequencies of the frequency estimators are set such that $w_1$, $w_2=0$, and are 14000 Hz as the actual frequency. Along with a lapse of time, 8000 Hz is found first, and then, 2000 Hz is found. The position error also decreases in amplitude when the vibration frequency of the disturbance is found.

As it is apparent from the above description, it is possible to eliminate the unstable operation by filtering the vibration frequencies of the two disturbance components and to improve the accuracy of the head position control according to the magnetic disk device of the present embodiment.

Second Embodiment

A configuration of a filter processing unit 2021 of an HDD 100 according to a second embodiment will be described with reference to FIGS. 10 to 12. Since the HDD 100 to which the present embodiment is applied is the same as that of the first embodiment, redundant descriptions will be omitted. Here, parts, different from those of the first embodiment, in the filter processing unit 2021 which is a feature of the present embodiment will be described.

Figure 10:
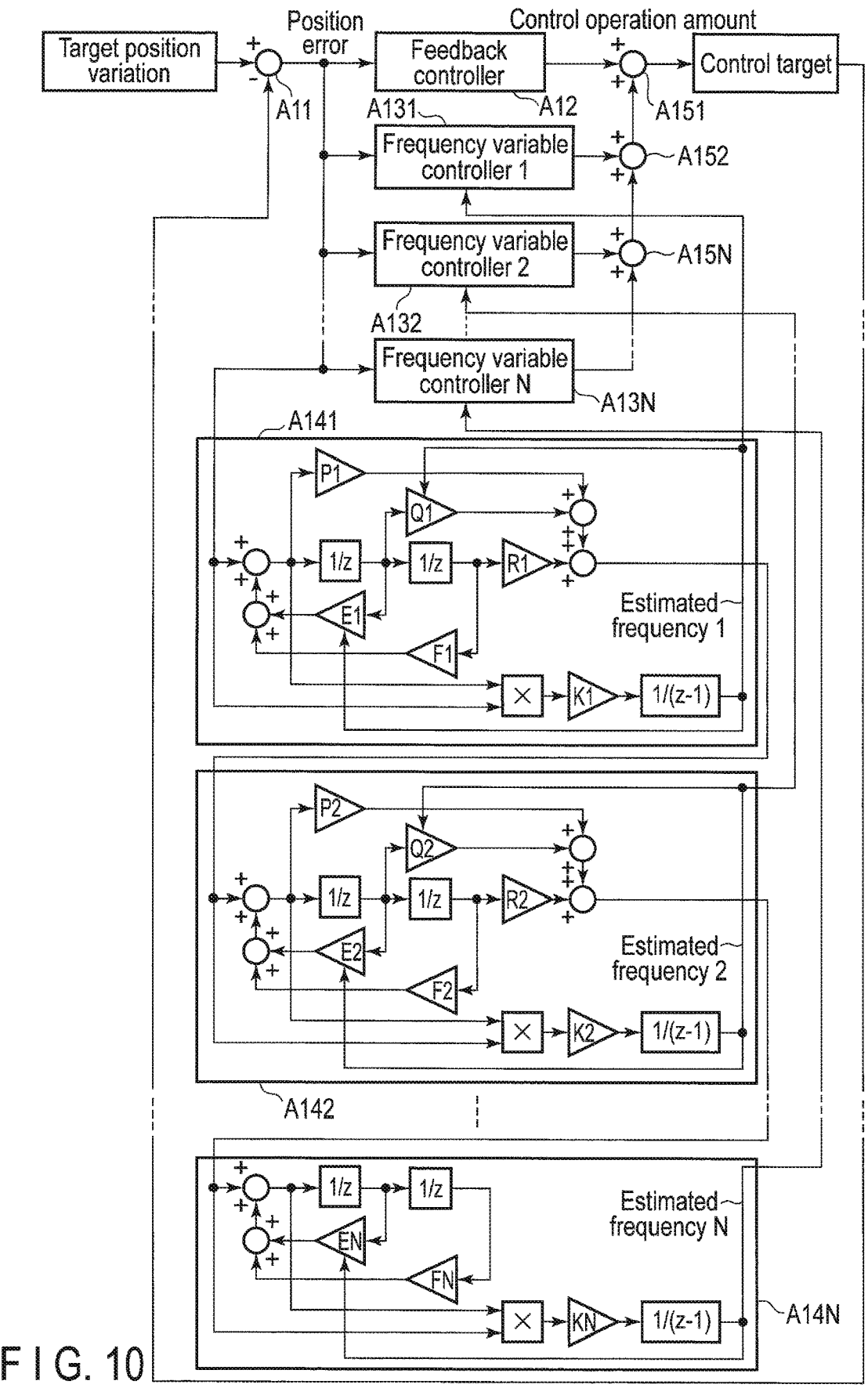
FIG. 10 is a block diagram illustrating a configuration of a filter processing unit of a magnetic disk device according to a second embodiment.

FIG. 10 is a block diagram illustrating a configuration of the filter processing unit 2021 according to the present embodiment. The filter processing unit 2021 illustrated in FIG. 10 includes N variable frequency control systems. Specifically, first to N-th variable frequency controllers A31 to A3N and first to N-th frequency estimators A41 to A4N are used as a set to estimate and filter vibration frequencies of N disturbances. That is, the filter processing unit 2021 copes with the case where the number of estimated frequencies is three or more by extension of the case where the number of estimated frequencies is two. Here, a numerator (P, Q, R) and a denominator (E, F) are calculated up to an (N−1)-th stage among the N-stage frequency estimators A41 to A4N, and the denominator (E, F) is calculated only at the N-th stage. As described above, the numerator is required for the next stage of calculation. There are N frequency variable controllers to adjust parameters from each estimation result.

Figure 11:
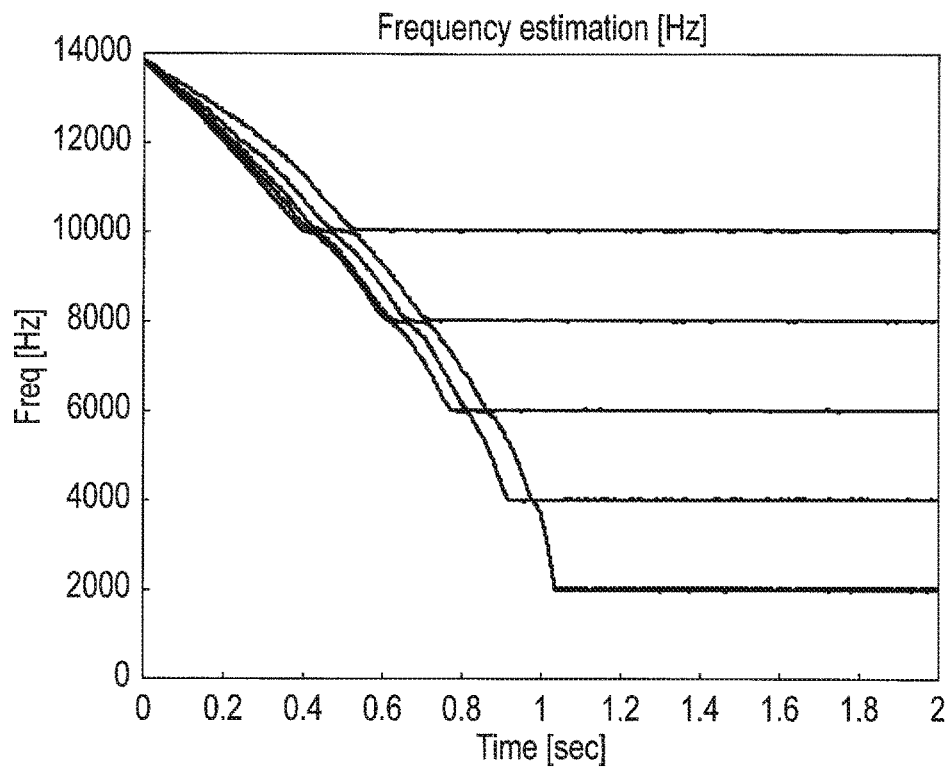
FIG. 11 is a waveform diagram illustrating a frequency estimation error when a disturbance component is present at 2000 Hz, 4000 Hz, 6000 Hz, 8000 Hz, and 10000 Hz in the second embodiment.
Figure 12:
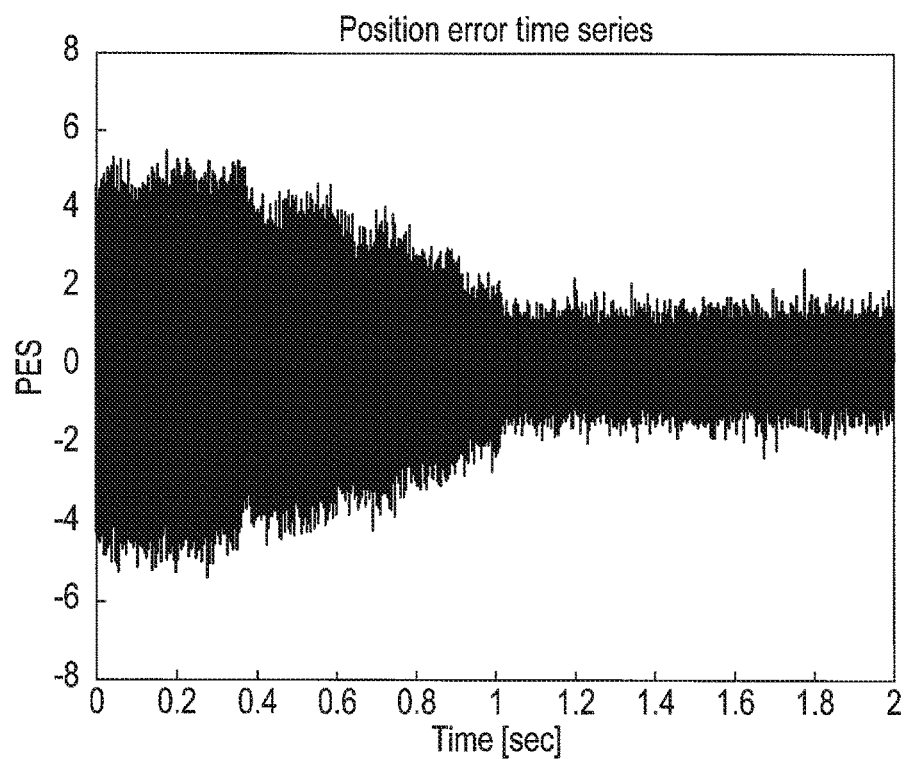
FIG. 12 is a waveform diagram illustrating a head position error when a disturbance component is present at 2000 Hz, 4000 Hz, 6000 Hz, 8000 Hz, and 10000 Hz in the second embodiment.

FIG. 11 illustrates a frequency estimation error when a disturbance component is present at 2000 Hz, 4000 Hz, 6000 Hz, 8000 Hz, and 10000 Hz in the present embodiment. In addition, FIG. 12 illustrates a head position error in the case of having the disturbance component at 2000 Hz, 4000 Hz, 6000 Hz, 8000 Hz, and 10000 Hz in the present embodiment. It is understood that the vibration frequencies of disturbances are sequentially found in the N frequency estimators along with a lapse of time with the initial actual frequency of 14000 Hz, and that the position error is also improved by filtering the frequencies, which is similar to the first embodiment.

As it is apparent from the above description, it is possible to eliminate the unstable operation by filtering the vibration frequencies of N disturbance components and to improve the accuracy of the head position control according to the magnetic disk device of the present embodiment.

Third Embodiment

A configuration of a filter processing unit 2021 of an HDD 100 according to a third embodiment will be described with reference to FIG. 13. Since the HDD 100 to which the present embodiment is applied is the same as that of the first embodiment, redundant descriptions will be omitted. Here, parts, different from those of the first embodiment, in the filter processing unit 2021 which is a feature of the present embodiment will be described.

FIG. 13 is a block diagram illustrating the configuration of the filter processing unit 2021 according to the present embodiment. In the filter processing unit 2021 illustrated in FIG. 13, a first frequency determiners A61 and a second frequency determiner A62 are interposed in output systems of a first frequency estimator A41 and a second frequency estimator A42, respectively, and a first switch A71 and a second switch A72 are interposed in output systems of a first frequency variable controller A31 and a second frequency variable controller A32, respectively.

That is, when an estimated frequency becomes an abnormal value in feedback control, there is a risk that a control system malfunctions and abnormal driving occurs so that the HDD is damaged. Therefore, whether the estimated frequency reaches the abnormal value is determined using the frequency determiners A61 and A62 in the present embodiment, and a cutoff control signal is sent to the switches A71 and A72 so as to cut off an output of a frequency variable controller of the corresponding system when it is determined that the estimated frequency is abnormal. Determination criteria for the frequency estimation abnormality include a case where an estimated frequency exceeds a frequency range that has been assumed in advance, a case where an estimated frequency is in a transient state for a certain time from start of frequency estimation, and a case where a variation range of the estimated frequency is large and unstable. As illustrated in the second embodiment, the same implementation can be applied for the case of having the N stages.

As it is apparent from the above description, even if an abnormal value occurs in the estimated frequency, it is possible to detect the abnormal value and to prevent the malfunction of the control system in advance according to the magnetic disk device of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a disc-shaped magnetic recording medium in which servo information including position information is recorded on a recording surface;
   a head which reads the servo information from the magnetic recording medium;
   a detector which detects a position of the head based on the servo information read by the head; and
   a filter which estimates a vibration frequency of a disturbance applied to the head and filters the estimated vibration frequency from a drive signal of the head,
   wherein the filter
   calculates a position error using a target position of the head given when driving the head and the position detected by the detection unit,
   estimates a plurality of the vibration frequencies by executing the vibration frequency estimation based on the position error in a plurality of stages in series, and
   filters estimation results of the vibration frequencies in parallel from the drive signal of the head.

2. The magnetic disk device of claim 1, wherein
   the filter
   uses an adaptive filter that self-adapts to each transfer function in the vibration frequency estimation executed in the stages in series
   to adjust all filter coefficients included in the transfer function of the adaptive filter based on the estimated vibration frequency.

3. The magnetic disk device of claim 2, wherein
   the filter
   calculates a numerator and a denominator of the adaptive filter from an initial stage to a stage immediately before a last stage in the vibration frequency estimation executed in the stages in series to use a result of the numerator calculation for calculation of a subsequent stage, and only a denominator is calculated in the last stage.

4. The magnetic disk device of claim 1, wherein
the filter
determines presence or absence of an abnormality of each of the estimation results of the vibration frequencies
to stop filtering of an estimation result determined to be abnormal.

5. A head position control method for a magnetic disk device, the method comprising:
reading servo information including position information from a recording surface of a magnetic disk using a head;
detecting a position of the head based on the servo information read by the head; and
estimating a vibration frequency of a disturbance applied to the head and filtering the estimated vibration frequency from a drive signal of the head, wherein,
in the filtering,
a position error is calculated using a target position of the head given when driving the head and the detected position of the head,
a plurality of the vibration frequencies is estimated by executing the vibration frequency estimation based on the position error in a plurality of stages in series, and
estimation results of the vibration frequencies are filtered in parallel from the drive signal of the head.

6. The head position control method of claim 5, wherein
in the filtering,
an adaptive filter that self-adapts to each transfer function is used in the vibration frequency estimation executed in the stages in series
to adjust all filter coefficients included in the transfer function of the adaptive filter based on the estimated vibration frequency.

7. The head position control method of claim 6, wherein
in the filtering,
a numerator and a denominator of the adaptive filter are calculated from an initial stage to a stage immediately before a last stage in the vibration frequency estimation executed in the stages in series to use a result of the numerator calculation for calculation of a subsequent stage, and only a denominator is calculated in the last stage.

8. The head position control method of claim 5, wherein
in the filtering,
presence or absence of an abnormality of each of the estimation results of the vibration frequencies is determined
to stop filtering of an estimation result determined to be abnormal.

* * * * *